United States Patent [19]
Hart et al.

[11] Patent Number: 5,838,979
[45] Date of Patent: Nov. 17, 1998

[54] PROCESS AND TOOL FOR SCALABLE AUTOMATED DATA FIELD REPLACEMENT

[75] Inventors: Johnson M. Hart, Weston; Ashraf Afifi, Burlington, both of Mass.; Antonio Pizzarello, Phoenix, Ariz.; Dominic Chan, Carlisle, Mass.

[73] Assignee: Peritus Software Services, Inc., Billerica, Mass.

[21] Appl. No.: 550,869

[22] Filed: Oct. 31, 1995

[51] Int. Cl.$^6$ .................................................. G06F 17/30
[52] U.S. Cl. ........................... 395/707; 395/684; 707/101
[58] Field of Search ................................ 395/7, 18, 707, 395/684; 707/101

[56] References Cited

U.S. PATENT DOCUMENTS

| | | | |
|---|---|---|---|
| 5,293,631 | 3/1994 | Rau et al. | 395/707 |
| 5,307,492 | 4/1994 | Benson | 395/707 |
| 5,600,836 | 2/1997 | Alter | 707/101 |
| 5,630,118 | 5/1997 | Shaughnessy | 395/601 |
| 5,634,089 | 5/1997 | Janniro et al. | 395/183.14 |
| 5,668,989 | 9/1997 | Mao | 395/612 |

OTHER PUBLICATIONS

IBM Corp., "Set the Century Window for Two–Digit Years," 1995, pp. 1–2.
IBM Corp., "Transform Two–Digit Year Dates to Four–Digit Year Dates," 1995, pp. 1–4.
A. Aho, J. Hopcroft, and J. Ullman. *The Design and Analysis of Algorithms*, pp. 129–145 (Addison–Wesley 1976).
Aho et al., *Compilers: Principles, Techniques, and Tools*, pp. 12–13, 49, 432–433, 633–636, 638–639, 643–648 (Addison–Wesley 1986).
Bernot, G. Gaudel, M–C., LeGall, P., Marre, B., "Experience with Black–Box Testing from Formal Specifications," *AQuIS93* Venice, Italy, pp. 75–84(1993).
Bijlsma, A., "Calculating with Pointers," *Science of Computer Programming*, vol. 12, No. 2, pp. 191–205 (Jul. 1989).
Bowen, J.P., Hinchey, M.G., "Seven More Myths of Formal Methods," *IEEE Software* pp. 34–41 (Jul. 1995).
Clarke et al., "Software Fault Trees and Weakest Preconditions: a Comparison and Analysis," *Software Eng. J.*, vol. 8, No. 4, pp. 225–236.
Craigen,D., Gerhart, S., Ralston, T., "Formal Methods Reality Check: Industrial Usage," *IEEE Transactions of Software Engineering*,pp. 90–98 (Feb. 1995).
Dijkstra, E.W., "Guarded Commands, Non–determinancy and a Calculus for the Derivation of Programs," *1975 International Conference on Reliable Software*, Los Angeles, CA, Apr. 25, 1975, pp. 2–2.13.
Fenton, N., "How Effective Are Software Engineering Methods?" *J. Systems Software*, 22:141–46 (1993).
Ferrans, J.C. et al., "HyperWeb: A Framework for Hypermedia–Based Environments," *SIGSOFT '92*, Tyson's Corner, VA, Dec. 1992, pp. 1–10.
Floyd, R.W., "Assigning Meaning to Programs," *Proc. Symp. on Applied Math*, American Mathematical Society, vol. 19, pp. 19–32 (1967).
Gallagher, K.B. and Lyle, J.R., "Using Program Slicing in Software Maint.," *IEEE Trans. on Software Engineering*, vol. 17, No. 8, pp. 751–761 (Aug. 1991).

Hart, J.M., "Experience with Logical Code Analysis in Softwre Reuse and Re–Engineering," *American Institute of Aeronautics and Astronautics* (1995) pp. 549–558.
Hoare, C.A.R., "An Axiomatic Approach to Computer Programming," *Comm. of the ACM*, vol. 12, No. 10, pp. 576–583 (Oct. 1969).
Hoare, C.A.R., "Proof of Correctness of Data Representations," *Acta Informatica*, vol. 1, No. 4, pp. 271–281 (1972).
Horowitz, E., and Sahni, S., "Fundamentals of Data Structures," pp. 3062–3309, Computer Science Press, Inc. (1976).
Humphrey, W.S., Kitson, D.H., "Prelim. Report on Conducting SEI–Assisted Assessments of Software Engineering Capability," SEI Technical Report, SEI–87–TR–16 (Jul. 1987).
Livadas, P.E. and Croll, S., "A New Algorithm for the Calculation of Transitive Dependencies," *Software Maint: Research and Pract.*, vol. 7, pp. 151–176 (1995).
Manna, Z., Waldinger, R., "Problematic Features of Programming Languages: A Situational Calculus Appraoch," *Acta Informatica*, Vol. 16, pp. 371–426 (1981).
Misra, J. Safety Properties, U. of Texas, Austin Report (1992).
Pizzarello, A., "Formal Methods in Corrective Software Maintenance," *Proc. of Formal Methods for Software Development, an International Seminar, AICA*, Milan, Italy (1992).
Pizzarello, A., "An Industrial Experience in the Use of Unity," Lecture Notes in Computer Science, Springer–Berlag 574 (1991).
Pizzarello, A., "New Method for Location of Software Defects," *AQuIS93*, Venice, Italy, Oct. 1993, pp. 143–156.
Pizzarello, A., et al., Program Maintenance Techniques, Lecture Notes, Peritus Software Services, Inc., Billerica, MA (Aug. 25, 1995).
Shahmehri et al., "Semi–Automatic Bug Localization in Software Maintenance," IEEE Comp. Soc. Press, pp. 30–36.
Sharir, M., "Structural Analysis: A New Approach to Flow Analysis in Optimizing Compilers," *Computer Languages*, vol. 5, pp. 141–153 (1980).
Staskauskas, M., "Specification and Verification of Large–Scale Reactive Programs," Ph.D. Thesis, U. of Texas, Austin (May 1992).
Ward, M., "Abstracting a Specification from Code," *Software Maintenance: Research and Practice*, vol. 5, 101–22 (1993).
Ward, M.P. et al., "Formal Methods for Legacy Systems," *Software Maintenance: Research and Practice*, vol. 7, 203–19 (1995).
Weiser, M., "Programmers Use Slices When Debugging," *Communications of Assoc. Comput. Mach.*, vol. 25, No. 7, pp. 446–452 (1982).
Wiser, M., Program Slicing, *IEEE Transactions on Software Engineering*, vol. SE–10 No. 4, pp. 352–357 (1984).

*Primary Examiner*—Emanuel Todd Voeltz
*Assistant Examiner*—John Q. Chavis
*Attorney, Agent, or Firm*—Stephen Y. Chow

[57] ABSTRACT

A process and tool for scalable, almost automatic, modification of interacting computer program units comprising the identification of variables affected by seed variables of known with attributes in equivalence classes and the modification of those variables identified with the target attributes.

10 Claims, 10 Drawing Sheets

InitializeUnionFind

2100
```
begin
    for each i ∈ V do
        begin
            set COUNT[i] :=1;
            set FATHER[i] :=0;
            set FORMAY[i] := unknown;
            if variable i is seeded then set FORMAT[i] to the
                seed value
        end
    RETURN ;
end
```

FIG. 5

FIND(i)

2200
```
begin
    make LIST empty;
    set v:=i;
    while FATHER [v] !=0 do
      begin
          add v to LIST;
          set v:= FATHER [v];
      end;
    /* v is now the root of the tree*/
    /* make all variables on the path point to the
        root. This is for computational efficiency. */
    for each w on LIST do set FATHER [w] :=v ;
    RETURN(v);
end
```

FIG. 6

```
UNION (i,j)
begin
    set LARGE := FIND[j];
    set SMALL := FIND[i];
    if COUNT[i] > COUNT[j] then
        exchange (LARGE, SMALL);
    set FATHER[SMALL] := LARGE:
    set COUNT[LARGE]:=
        COUNT[LARGE] + COUNT[SMALL];
    if FORMAT[LARGE] = unknown then
        set FORMAT[LARGE]:= FORMAT[SMALL];
    RETURN;
end
```

FIG. 7

PROCESS AND TOOL FOR SCALABLE AUTOMATED DATA FIELD REPLACEMENT

COPYRIGHT NOTICE

A portion of the disclosure of this patent contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PAPER APPPENDICES

Paper appendices of script and source code listing for an embodiment of the invention is included herewith and incorporated by reference, namely, Appendix A, a 20-sheet script entitled tc21.clp, Appendix B, a 10-sheet script entitled vtc17.clp, Appendix C, a 7-sheet script entitled ptc.clp, Appendix D, 42 sheets of C-language programs (10 sheets cobdlex, 1 sheet cobdfix.mak, 2 sheets chkvar. p, 1 sheet correct.h, 13 sheets cobdyacc, 6 sheets correct.c, 1 sheet corrector.config, 4 sheets preproc.c, 1 sheet var1.pl, and 3 sheets var2.p1) for text correction of a COBOL data division, and appendix E, 65 sheets of C-language programs (6 sheets of correct.c, 1 sheet of correction.p1, 1 sheet of correct.h, 4 sheets of preproc.c, 1 sheet of proc1.p1, 2 sheets of proc2.pl, 38 sheets of cobpyacc, 1 sheet of cobpfix.mak, and 11 sheets of cobplex) for text correction of a COBOL procedure division.

BACKGROUND OF THE INVENTION

The field of the invention is that of software maintenance, and, specifically, the global modification of complex collections of interacting computer programs to change the representation of a variable (or memory field), which may, for example, involve the global extension of the sizes of associated declared variables in many interacting programs in COBOL, PL/1, FORTRAN or other language.

One of the major problems in the field of software maintenance as the twenty-first century approaches is how to assure proper functioning of many millions of lines of computer code programmed and maintained over decades implementing the assumption that the two least significant digits of a year were adequate indicate the year. Many of these programs are written in the COBOL, PL/1 or FORTRAN languages and are used at major financial and other institutions on a continuous basis. Without modification, once these programs begin to address years 2000 and beyond, there will be errors.

Proposed solutions rely on software maintenance programmers (human) knowing what the collective code does. Tools exist to assist in acquiring knowledge of code details. Many of these tools are based on pattern matching, that is, they rely on the semantic hypothesis that the original code authors used mnemonics for identifying variables. Thus, most proposed solutions to the "Year 2000 Problem" are based upon using pattern matching to create a "suspect" list of variables that appear to be date-sensitive. Pattern matching tools, complete with a report generator, can be assembled with off-the shelf UNIX utilities such as grep. However, pattern-matching (1) generates false positives, such as incorrectly adding the variable "PREMIUM-YEAR-TO-DATE" to the suspect list on the basis of the pattern "YEAR"; (2) generates false negatives, such as incorrectly omitting the variable "TERM" from the suspect list where a "YEAR" had been loaded into the variable; and (3) ignores two-digit constants which may or may not represent a year. These inadequacies make it impracticable to modify programs and related databases on a large scale.

SUMMARY OF THE INVENTION

The present invention does not assume any application domain knowledge and thus avoids the pitfalls of semantic assumptions that may lead to the types of errors described above.

It is a particular objective of the present invention to provide an almost fully automated process and tool for reliably modifying data fields or parameters in large, "organic", computer programs or collections of computer programs and their associated databases.

It is a further objective to provide such a process or tool that can be scalably applied to portions of such large collections of code and data so as to permit batch modifications at convenient times to minimize interference with the day-to-day use of the code.

The invention involves the assignment of format attributes to every variable and constant instance in an "old program" compilation unit. These assignments are maintained in an "attribute database". Identification of the variables to be modified is accomplished by initializing the process with a set of seed variables with the desired attributes and assigning others by syntax-directed propagation reiteratively until all variables and constants sharing the same attribute are identified, in "local transitive closure."

In operation, variables declared in one program may interact with variables in another program through one or more common files or other programs. Accordingly, in the invention, a global attribute database is maintained with the attributes of all variables which are subroutine parameters or arguments. Again, each compile module (that is, code that is compiled at the same time into runtime code to be linked) is processed in turn, and then the entire cycle is repeated until there are no changes, thus constructing the "global transitive closure."

The identification and correction of variables is facilitated in the invention by the translation of the old program into an intermediate language. This has the further advantages of allowing global modification of programs written in different languages (COBOL, FORTRAN, PL/1, etc.) and installation of the tool on a variety of platforms, such as the software maintenance client's mainframe or server.

The identification and correction of variables is further facilitated in the invention by the use of a rules-based expert system to provide an reliable, flexible and efficient means of implementation. This use aids the scalability of the tool.

The tool, implemented on a UNIX workstation such as a Sun or IBM RS 2000, has converted a COBOL program of 0.36 million lines in approximately five hours of identification and three hours of correction.

DESCRIPTION OF THE DRAWINGS

FIG. 5 is code for an initialization subroutine.

FIG. 6 is code for a propagation subroutine.

FIG. 7 is code for an update subroutine.

DETAILED DESCRIPTION

The tool described herein has been implemented in the "C" programming language and in scripts for a commercially available rules-based expert system on UNIX-based engineering workstations such as SUN and IBM RS6000. These workstations typically include a user interface such as a keyboard and/or pointing device, a central processing unit, system memory, a direct access storage device, and a display such as a monitor. It will be apparent to those of skill in the art that the tool may be implemented in other programming languages, on other platforms, or in hardware without departing from the scope of the invention. Moreover, although the target programs described herein are written in the COBOL language, the invention applies generally, and has been applied, to other programming languages, such as PL/1 and FORTRAN.

Figure 1:
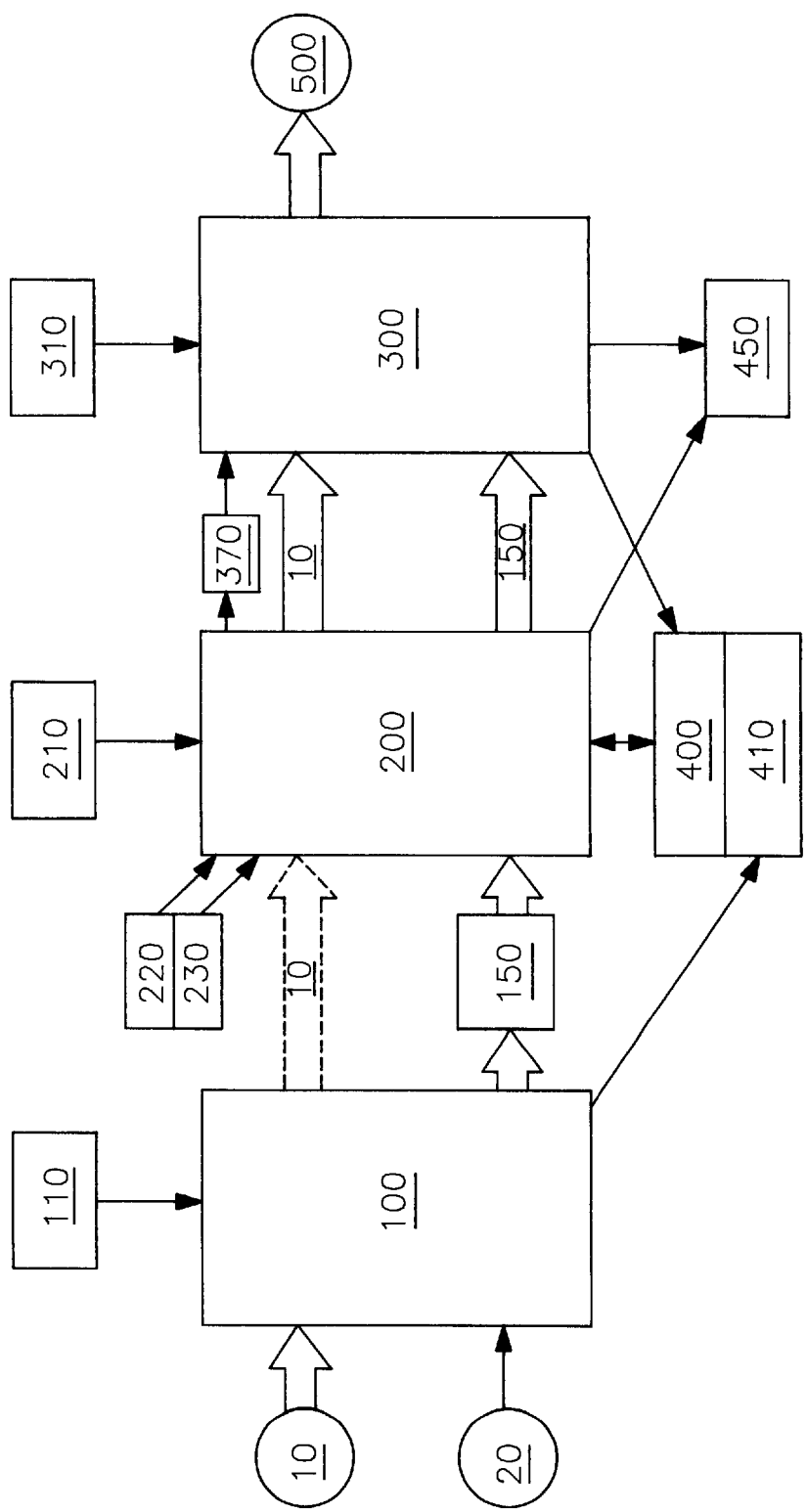
FIG. 1 is a block diagram of a tool for scalable automated data field replacement in accordance with the principles of the invention.

In the embodiment shown in FIG. 1, an old program ("OP") or compilation unit 10 is input into front end 100, which translates the program into intermediate language program 150. The translation is made according to front end rules 110 for translating instructions into an intermediate language, which allows programs written in different languages to be used in the invention. In an embodiment tested, the intermediate language was optimized for other processing, based upon Dijkstra's guarded commands. A detailed description of this intermediate language is provided in commonly owned co-pending patent application Ser. No.60/007,134 (attorney docket number 1052-39-137) and entitled "Code Analyzer", pending which is hereby incorporated by reference in its entirety for all purposes.

In this implementation, intermediate language code is exemplified by the following statement:

0 23 0.0.1.2 assign $x=y+3$

The first field includes information as to the source file from which the code derives. The second field contains the line number within that source file. The third field contains a block identifier uniquely identifying a block of code in the source code, which defines a procedure, such that "if" and "do" statements define blocks within which there may be sub-blocks. The fourth field contains instructions corresponding to the source code in the form of modified or extended Dijkstra's guarded commands. In the implementation here, the statements include:

assign: basic assignment if: corresponding to conventional if-then-else do: standard iteration type: to specify type information member: to declare a member of a structured type or field call: standard call goto: standard goto return: classic return proc: general purpose no-op LABEL: defines a label in the intermediate language L-entry: to introduce labeled procedure entries L-procedure: to introduce labeled procedures file: to introduce new source files analyzed Version: provides information about version of language The front end 100 for converting the source code 10 into the intermediate language includes a scanner, parser and code generator available commercially such as FLEX and YACC, which are part of the UNIX operating system package, or BISON, available from the Free Software Foundation, Cambridge, Mass. Front end 100 also processes Job Control Language ("JCL") 20 and other directives that connect programs using data files.

The front end 100 creates a symbol table 410 (detailed in FIG. 3), which, for the COBOL implementation, has an entry, "symbol node" 401, 406 . . . , indicating the node name, the COBOL level, the virtual address, and the COBOL attributes (e.g., PIC) and values 404, 406 for each component (level), as well as pointers to the COBOL-level "parent" 402 and "child" 403. These nodes are indexed through a hash table 470 based on the symbol name, as a hash table 460 by index (integer). This is a common type of COBOL symbol table and may be implemented differently without affecting the invention.

Once the OP is converted into the intermediate language, it is processed to identify variables whose fields (formats) are to be modified. As an overview, the variable identification process commences with the specification of one or more "seed" variables of known format or attribute, such as "DATE", having a format "YYMMDD". The identification continues by dividing all variables in the program into non-intersecting "equivalence classes" or subsets determined or defined by the equivalence relationship, "same format as". The equivalence relationship R has the properties of being reflexive ("aRa"), symmetric ("if aRb then bRa") and transitive ("if aRb and bRc then aRc"). In an embodiment of the invention, the process of determining which variables are members of an equivalence class is accomplished by using the transitive nature of the "same format as" relationship to add to the members of the equivalence class until there are no more variables to be identified, thereby achieving "transitive closure". Further, the "same format as" relationship is determined from the format of a variable as determined by its syntactical interactions (in procedure statements, such as "move" or "compare") with variables of known format or attribute, that is, starting with the seed variables and continuing with variables previously identified to the equivalence class. Thus, the attributes of the seed variables are propagated, either by "bottom-up" synthesis or by "top-down" inheritance. For example, "MOVE BILLING-DATE-YR TO DURATION-WS" propagates the attributes of "BILLING-DATE-YR" to "DURATION-WS" by synthesis or from "DURATION-WS" to "BILLING-DATE-YR" by inheritance. An aspect of the invention is the application of the principle that while data flow "BILLING-DATE-YR" → "DURATION-WS" may be unidirectional, "attribute implication" is bidirectional, that is, the attribute of "DURATION-WS" may be traced or propagated backwards.

Figure 2:
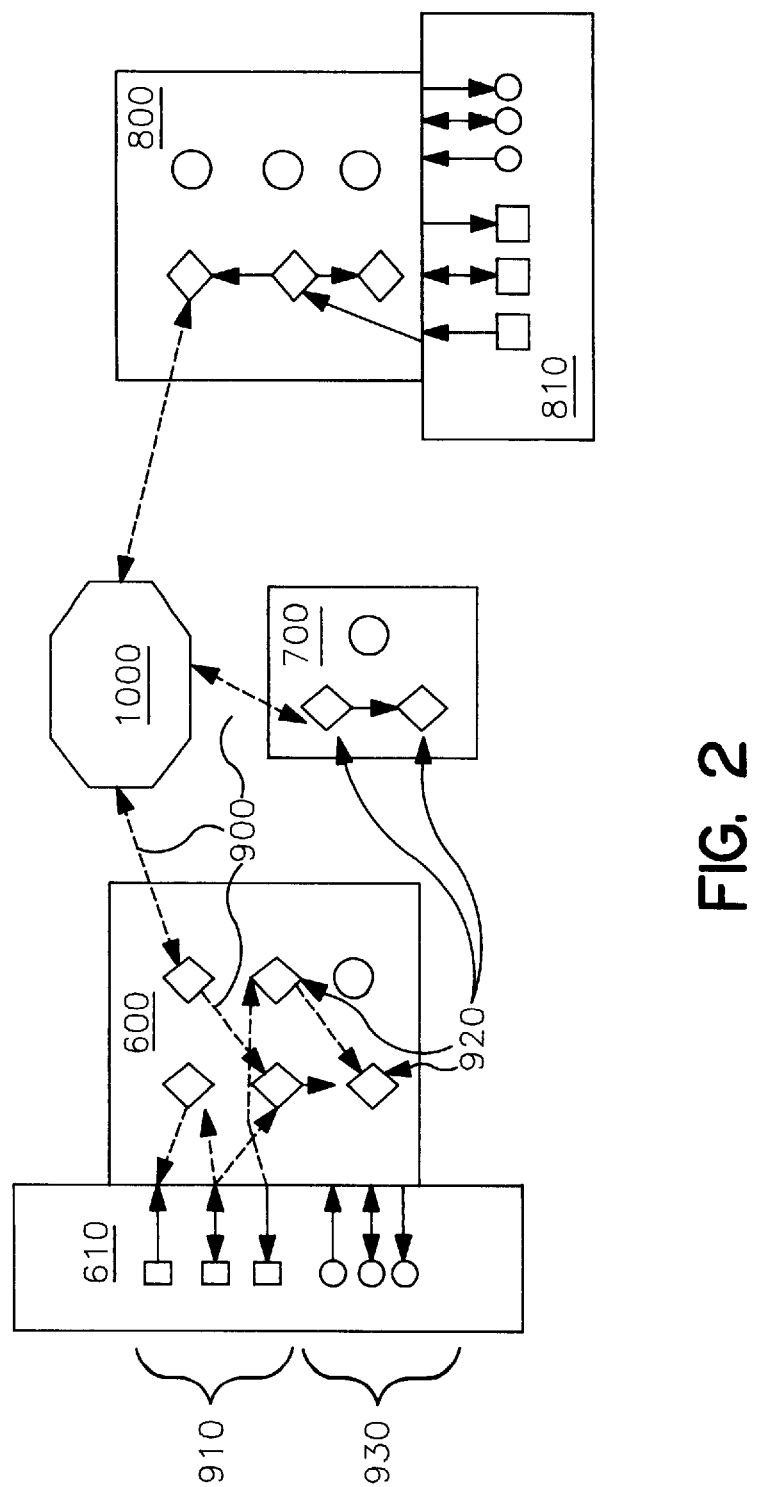
FIG. 2 is a schematic depiction of the identification process.

The general process of propagating attributes is shown schematically in FIG. 2 where date-sensitive input/output variables 910 in files 610 and 810 interact with date-sensitive variables 920 in modules 600 and 800, respectively, causing the attribute propagation 900, which is recorded into the global attribute database 1000, thus permitting the identification into equivalence classes of additional updated variables in module 700. The identification process is repeated until no new variables are further identified to the equivalence class, that is, the calculation of the transitive closure of the variable sets containing variables with the same attribute has been completed.

For a compile module, this closure is at a local level in a set of equivalence relations L. The local transitive closure identifies variables within one module such as in:

```
if X=Y then . . .   }
      . . . .       }
Move X into Z       }
```

If one starts with X as a date-sensitive variable (either by manual seeding or as one of the previously identified variables), then both Y and Z are date-sensitive. All three variables are declared in the date declaration portions of the same program.

Where variables match through linkage sections (subroutine calls) or interact with other modules via files, global transitive closure may be reached through interpretation of the JCL 20 and a similar process of reiterative propagation resulting in equivalence relations G. The global transitive closure is done by identifying variables with the same attribute (e.g., date-sensitive) in different modules. For example:

```
if X=Y then . . .       }    Program 1
    . . . .             }
Write X on FILE G       }
Read FILE G into Z      }    Program 2
    . . . .             }
if Z=A . . .            }
```

Z is actually X in Program 1. Now A in Program 2 is related to X in Program 1 via Z.

In one embodiment, for modification of data fields to accommodate the year 2000, a table of variables with their attributes is maintained in the database 400, which is distinct from the symbol table 410 (it does not need to be). The format attribute consists of an attribute letter for each byte indicating century C, year Y, month M, day D, not-a-date N or unknown Z. The width or offset is also indicated, as well as the base such as "1800" or "1900" for a CYY attribute. In the embodiment, the L equivalence relationship (class) is initialized in the front end 100 by finding interacting variables (moves, computes, I/O operations, etc.) and identifying those variables to the class. At the identifier 200, initial seeds 220 establish date formats for some variables, typically I/O variables, or exceptions (non-date seeds) 230. Every time variables interact through subroutine calls, they are added (identified) to G, the global equivalence class. Every occurrence of a REDEFINES in COBOL (or equivalent commands in other languages giving different names to the same storage location, e.g., FORTRAN COMMON, C union) creates an L equivalence relationship between the variables and fields within structures. Every move of a part of a record or array creates an L equivalence relationship between the target and destination fields. Arithmetic and comparison combinations create additional relationships. Whenever a variable is truncated so that the YY part of a variable is lost, any existing L relationship between the variables is removed. At every step where an addition is made to G or L, the identifier 200 updates the database 400 and propagates attributes among related variables. A report is generated at 450. The identifier 200 continues this process through all the compile modules until there are no changes to any formats. This may require several passes through the compile modules to account for all the subroutine linkages. When the process is complete, the attribute databases contain all the information on variables of all types.

The general procedure for calculating transitive closure is shown in the following pseudo-code, applied one module at a time:

```
input a seed variable in X
; repeat while X is not empty →
    s := a variable from X;
    remove s from X
    repeat while there are statements in the program →
    if statement contains s →
        identify all variables associated with s
        store the newly found variables into L and X
        identify global connections and store them (if they
            exist) into global relationship database GR
        get next statement
    [ ] statement does not contain s →
        get next statement
    fi
    end repeat
end repeat
```

Calculation of the global transitive closure G generally uses the same procedure, with a non-empty list of the global variables in GR as seeds and a set of possibly interacting programs (referring to JCL and linkage sections).

Figure 3:
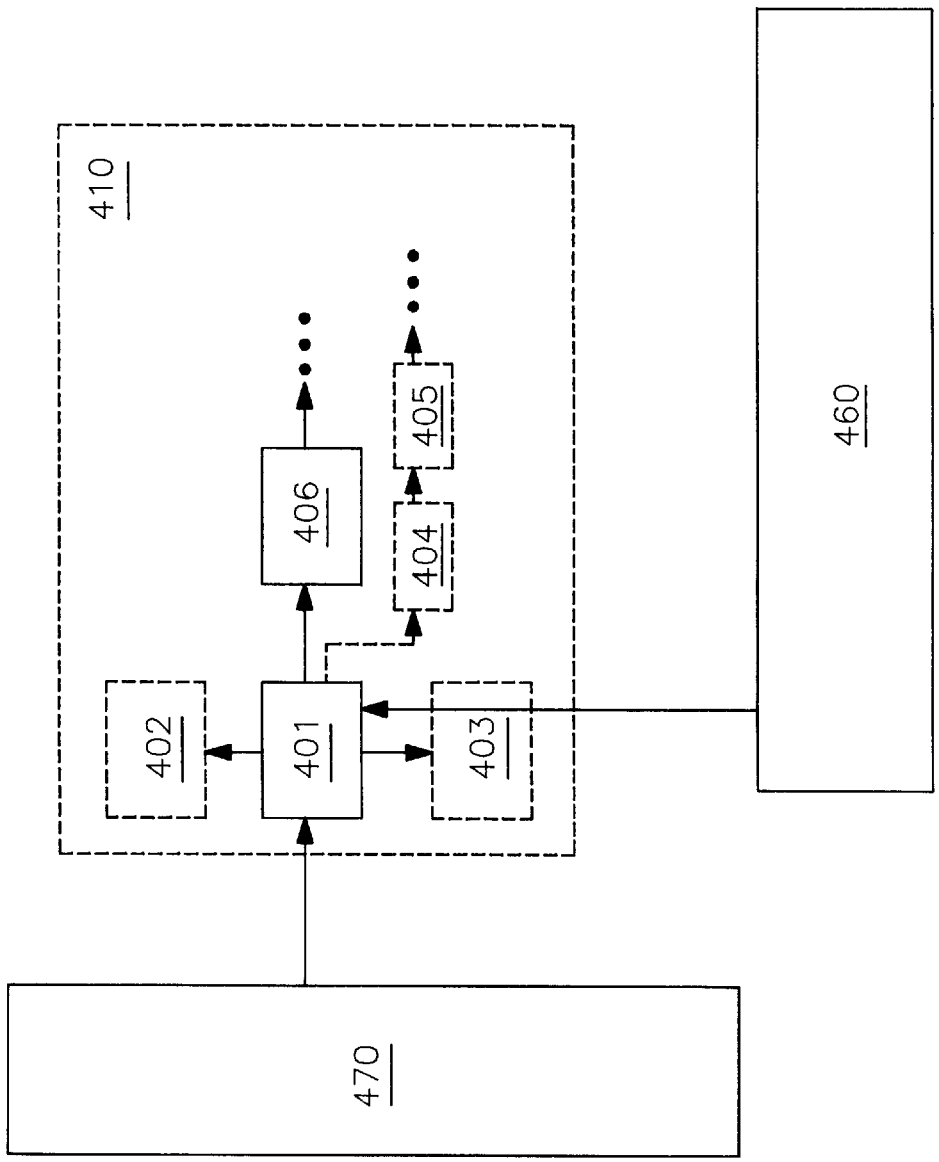
FIG. 3 is a schematic depiction of the symbol table.
Figure 4:
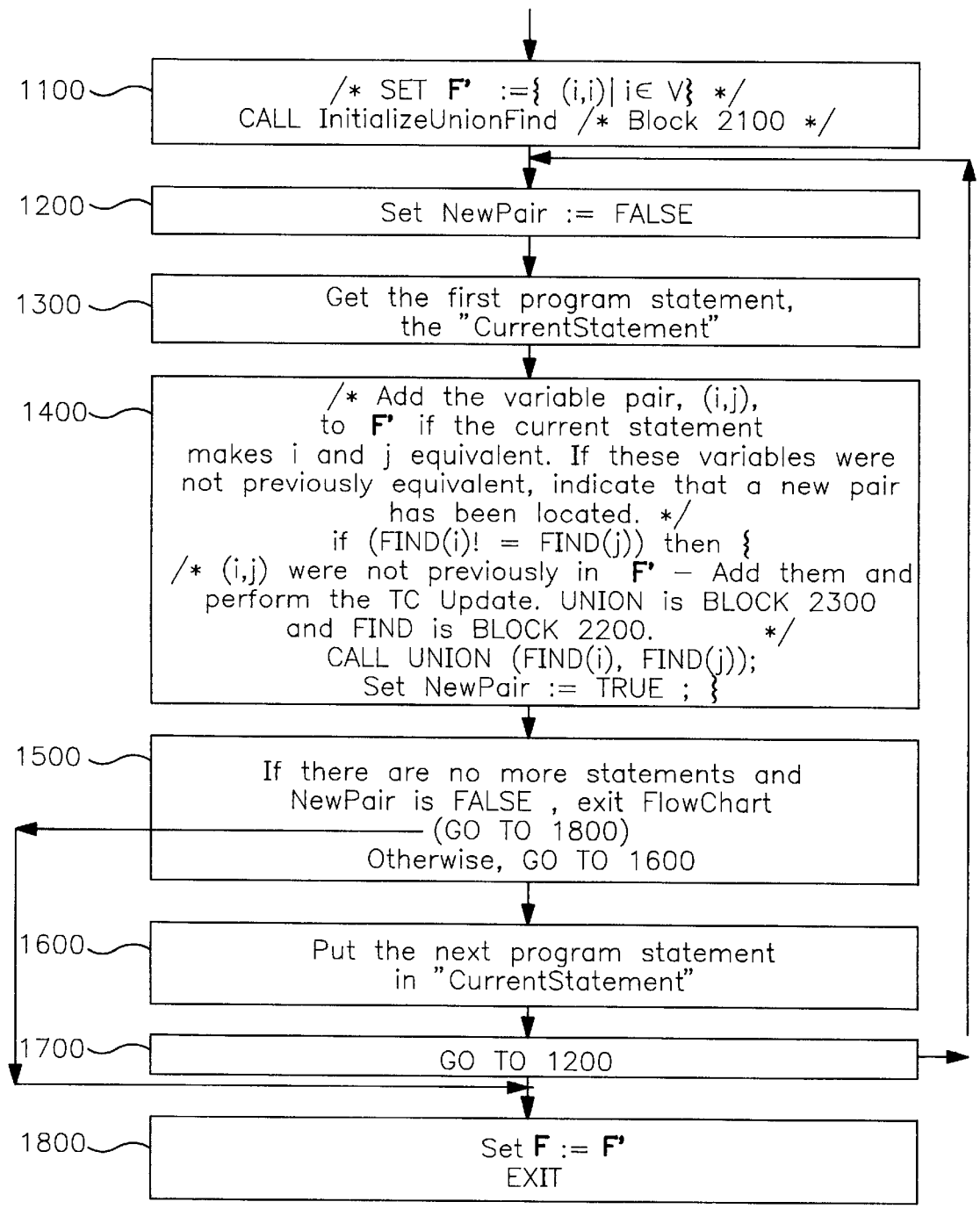
FIG. 4 is a flow diagram for the underlying identification routine.

From a process point of view, identification of variables (calculation of transitive closure) is structured as shown in FIG. 4, where F is the transitive closure of a format equivalence relationship and F' is the intermediate relation used in the computational process. In this implementation, members of the variable set, V, are indices (integers) into tables used to represent the sets (equivalence classes), denoted by i, j, etc. The symbol table 410, which may be called SYM_TABLE, FIG. 3, gives the actual variable name so that, for instance, we might have SYM_TABLE[i] =a. There is also a table FORMAT such that FORMAT[i] is the format (such as YYMMDD) of a variable, unknown indicating that the format is not yet determined.

The process in this example uses standard "union-find" subroutines set forth in A. Aho, J. Hopcroft, and J. Ullman, *The Design and Analysis of Algorithms* at 129 ff. (Addison-Wesley 1976), and shown in FIGS. 5–7. In the implementation, there are two arrays, "COUNT" and "FATHER", such that for each variable, COUNT[i] is the number of elements in the class i if FIND(i)=i.

FATHER[i] is another variable in the same class as i; and

FORMAT[i] is the format of the variable.

The "InitializeUnionFind" subroutine block 2100 is shown in FIG. 5 and called by block 1100 in FIG. 4 to initialized the transitive closure calculation.

The FIND(i) function subroutine (block 2200 in FIG. 6) returns an index of the class that i is a member of. Thus, variables i and j are known to be format equivalent if and only if FIND(i)=FIND(j).

The subroutine UNION(i, j) (block 2300 in FIG. 7) puts i and j into the same class by performing the union of the two classes.

In the computation of format equivalence classes shown in FIG. 4, block 1100 calls the InitializeUnionFind subroutine in block 2100 to initialize F', setting FORMAT[i] to unknown or the seed value (from 220 or 230 in FIG. 1). Block 1200 sets the "NewPair" flag to false. Block 1300 gets the first program statement from the intermediate language program (150 in FIG. 1) as "CurrentStatement". Block 1400 examines the statement to determine all pairs of variables i and j that are equivalent as a consequence of the statement (using the rules of attribute implication) and then adds the variable pair (i, j) to F' as a transitive closure update using the UNION subroutine in block 2300. If the variables were not previously equivalent, the new pair is indicated by setting "NewPair" to true. At block 1500, if there are no more statements and "NewPair" is false, then transitive closure is reached, and the next step is to set F equal to F' and exit at block 1800. Otherwise, the next program statement is placed in "CurrentStatement" at block 1600 and the flow returns to block 1200 until there are no more statements.

In the embodiment tested, the underlying process shown in FIGS. 4–7 is alternatively implemented using an expert system that eliminates loops for each variable by keeping track of which variables have already been defined with an attribute while queued rules "fire" on variables not yet defined. After the translation by the front end 100, the resulting intermediate language code 150 and symbol table 410 is processed by the identifier 200 according to identification rules 210 based upon syntax-directed definition or attribute grammar, along with seeds 220 and exceptions 230 (that is, variables known to be not date-sensitive). In the embodiment, the identifier 200 is a rules-based expert system shell known as CLIPS ("C Language Integrated Production System") Version 6.0, originally developed by the National Aeronautic and Space Administration and available from "COSMIC" at The University of Georgia, Athens, Ga. (706-542-3265), extended with calls to lower levels, with rules provided according to the invention, and linked to the modified compiler tools forming the front end 100.

A listing of the identification rules 210 is set forth as Appendix A hereto. These rules operate effectively in parallel according to levels of priority (salience="0" being the base). In this implementation, the variables sought for transitive closure (equivalence class) are the lowest level COBOL variables that are date-sensitive (having a "YY" component), rather than variables with identical formats. For example, a COBOL level 02 variable in the format "CYY" may be equivalent to a COBOL level 01 variable in the format "YYYY" in this implementation; the specific date formats are determined in a "parallel" process and added to the attribute database ("transitive closure file") 400. The principal rules 210 are as follows:

get-seeds: converts seeds 220 (provided in a batch file "seed.io.db") into fully qualified names ("x.y.z. . .") showing COBOL levels)

rem-overlap-mtc: removes exceptions 230 (".nsd") with high priority apply-initial-seeds: propagates the seeds, scanning through each statement of the code getUses: identifies new variable to transitive closure upon data flow "x→y" and propagates from that source code line forward (forward propagation)

getKills: identifies source code line for initiation of variable identified by data flow "x→y" (backward propagation)

getIfKills1 and getIfKills2: identifiy source code line for initiation of variable identified by data comparisons "x==y" (backward propagation)

getKillUses: identifies source code line for initiation of variable identified by data flow "x→y" and propagates for each line thereafter (forward propagation)

getIfKillUses1 and getIfKillUses2: identify source code line for initiation of variable identified by data comparisons "x==y" and propagates for each line thereafter (forward propagation)

mtc-to-tc-0: intermediate update to transitive closure analyze-f: continues the process for the next module ("goal") at a low priority (after "firing" of other rules)

These rules are queued and "fired" until there are no more variables to identify, and the next OP module (typically 2–3,000 lines of COBOL), previously translated into intermediate language 150 (.pil in Appendix A) with symbol table 410 (.cob.sym), is analyzed. After applying the seeds 220 (seed.io.db) and exceptions 230 (.nsd), the transitive closure file 400 is developed in two components. The first file (.td), providing information as to each variable, includes the module name, variable name, variable size, date format, date offset, line number and a reference flag. The second file (.tdc), providing the relationship or attribute propagation path, includes the module name, a first variable name, a second variable name, an indication of data flow from one variable to the other, line number and indication of the source of attribute implication. Together, these provide a description of the equivalence classes among the set of variables in the program module. Following is an example of a "transitive closure" file, forming the attribute database 400:

```
(tc h20501050 TIMEDATE-DATA.TDATE-DIGIT-DATE.TYEAR 2 yy 0 0 o)
(tc h20501050 TIMEDATE-DATA.TDATE-DIGIT-DATE.TYEAR 2 yy 0 88 o)
(tc h20501050 TIMEDATE-DATA.TJULIANDATE 5 yyddd 0 89 o)
(tc h20501050 TIMEDATE-RECORD.TIMEDATE-JULIAN-DATE 5 yyddd 0 0 o).
(tc h20501050 TIMEDATE-RECORD.TIMEDATE-JULIAN-DATE 5 yyddd 0 88 o)
(tc h20501050 TIMEDATE-RECORD.TIMEDATE-MMDDYY.TIMEDATE-YEAR 2 yy 0 0 o)
(tc h20501050 TIMEDATE-RECORD.TIMEDATE-MMDDYY.TIMEDATE-YEAR 2 yy 0 88 o)
(tc h20501050 TIMEDATE-RECORD.TIMEDATE-NEXT-MMDDYY.TIMEDATE-NEXT-YEAR
    2 yy 0 0 o)
(tcd h20501050 TIMEDATE-DATA.TDATE-DIGIT-DATE child
    TIMEDATE-DATA.TDATE-DIGIT-DATE.TYEAR 0)
(tcd h20501050 TIMEDATE-DATA.TIMEDATE-JULIAN-DATE ->
    TIMEDATE-DATA.TJULIANDATE 89 TIMEDATE-DATA.TJULIANDATE)
(tcd h20501050 TIMEDATE-DATA.TIMEDATE-JULIAN-DATE ->
    TIMEDATE-DATA.TJULIANDATE 89 TIMEDATE-RECORD.TIMEDATE-JULIAN-DATE)
(tcd h20501050 TIMEDATE-RECORD.TIMEDATE-MMDDYY child
    TIMEDATE-RECORD.TIMEDATE-MMDDYY.TIMEDATE-YEAR 0)
(tcd h20501050 TIMEDATE-RECORD.TIMEDATE-NEXT-MMDDYY child
    TIMEDATE-RECORD.TIMEDATE-NEXT-MMDDYY.TIMEDATE-NEXT-YEAR 0)
(tcd h20501050 seed == TIMEDATE-RECORD.TIMEDATE-JULIAN-DATE yyddd
    TIMEDATE-RECORD.TIMEDATE-JULIAN-DATE)
```

Also generated are linkage descriptions 320 (.pca file) indicating the caller, callee, caller argument, callee argument, caller component, callee component, format of data, offset within component and the attribute implication direction (caller or callee). A report 450 is also generated for input-output variables and linkages that were identified in the identification process which had been omitted from the seed 220.

The procedure may be applied module-by-module, or the program modules may be linked prior to translation and identification.

When equivalence is detected among variables in different modules that interact through linkage sections or through files that both modules process, these are added to the transitive closure or attribute database (400 in FIG. 1), for example, by seeding. Similarly, when equivalence is detected among variables in different programs that interact through shared files, these are added to the transitive closure database (400 in FIG. 1). These equivalent variables are detected by processing JCL statements 20 to determine which files are processed by which programs. With the linkage information, the transitive closure database 400 becomes a "global attribute database". In this implementation, the global attribute database is an aggregated local transitive closure database.

In an alternative implementation being developed, the transitive closure data base is simplified into a single data structure including variable details, data flow direction and implication direction, combining the .tc and .tcd entries and part of the symbol table information. The rules are also simplified into three main rules: apply the seeds through scanning the code; propagate forward from the line of data flow; and propagate backward to the line where initialization occurred.

In another aspect of the invention being developed, "suspects" identified by a semantic pattern, such as a variable named "XX-YR-XX", may be propagated as in the transitive closure calculation described here. If the propagation results in overlaps of the suspects, a probability may be inferred that an isolated chain of date propagation had been missed on the seeded transitive closure calculation, possibly because a date-sensitive input/output variable had been overlooked in the seeding process. If the propagation hits a known non-date variable, then the "false positive" pattern match can be eliminated. This cross-checking allows for additional quality assurance over the transitive closure calculation.

Once the identification process is completed, the correction process begins. The code corrector is depicted as block 300 in FIG. 1, which, in the COBOL-directed implementation, is divided into four phases: (1) "cleaning up" of the attribute database 400 according to rules 310 using the CLIPS system and acting with the attribute database 400, symbol table 410 and intermediate language program 150; (2) generation of data division correction commands according to rules 310 using the CLIPS system and acting with the attribute database 400 and symbol table 410; (3) generation of procedure division commands according to rules 310 using the CLIPS system and acting with the attribute database 400, symbol table 410 and intermediate language program 150; and (4) application of the correction commands to the source code 10 using UNIX tools FLEX and YACC or BISON to result in corrected code 500. Phases (1) and (2) are batched together in the implementation (see Appendix B) and phase (3) run separately (see Appendix C). Phase (4), the text correction is accomplished with a set C-language programs each for the data division (Appendix D) and for the procedure division (Appendix E).

Each correction is driven by a correction rule 310 which is invoked when certain code usage patterns are identified.

Upon completion of identification, the attribute database 400 contains an entry, with format, for every variable. From this information, the corrector 300 can determine which variables are date-sensitive and which of those are dates. The correction rules are invoked based on the actual old code and the attributes of the variables involved that occur in a line, or group of lines, of code. The correction rules are grouped into three categories, corresponding to the first three phases mentioned.

(1) Isolation rules govern the separation of the date-sensitive variables into those that are dates and those that are not, thereby "cleaning up" the attribute database 400. These are applied to attribute database 400, symbol table 410 and the intermediate language code 150. On completion of application of these rules, the attribute database 400 will contain all date-sensitive variables and their formats. Those date-sensitive variables that are dates are indicated by the use of the offset attribute (date variables have an offset). Date-sensitive variables that are not dates may be durations (elapsed periods of time) or ages. This process removes date-sensitive variables from the list of date-variables, but allow them to be identified for widening. Principal rules include the exclusion of computed date variables, recognizing that the result of operations between two dates cannot be another date, and the removal of "not-a-date" variables (this is alternatively done in the identification process in the current implementation).

(2) Data Division Correction Rules (Appendix B) govern the correction of the data division, primarily merging year and century fields and widening fields to accommodate 4-digit years. These are applied to attribute database 400, the symbol table 410 and the intermediate language code 150. After initialization, including the removal of blanks, the century indicator is removed by merging separate "C" and "YY" variables within a structure into a single "CYY" variable. The single century indicator field is then extended into a four digit year. Also, two-digit year fields are extended into four-digit year fields. A sample command is "change width", with the arguments of module name, variable name, initial size, new size, source code file name and source code line number.

(3) Procedure Division Correction Rules (Appendix C) govern the correction of the code, primarily adjusting constants, removing the century indicator logic when it is present in the old code and expanding the year field to four digits. These are applied to attribute database 400, symbol table 410 and the intermediate language code 150. Other cases include the addition of the logic for a century indicator where only a two-digit year representation is used and the user chooses to add the century indicator as the solution to the year representation problem. The rules include removal of constants, warnings for duration inconsistencies, removal of duration from the attribute database, fixing CYY relation/compare (a constant is compared to a variable that was originally a "CYY" format, add the base of the variable to the constant, if constant is greater than 1900, otherwise issue warning), fixing CYY assignment (constant assigned to a variable that was originally a "CYY" format, add the base of the variable to the constant), fixing YY relation/compare, fixing YY assignment, fixing CYYMM relation/compare, fixing CYYMM assignment, fixing YYMM relation/compare, fixing YYMM assignment, fixing CYYMMDD relation/compare, fixing CYYMMDD assignment, fixing YYMMDD relation/compare, fixing YYMMDD assignment, warning of YY truncation, as well as bookkeeping and initialization rules. A sample command is "change constant" with the arguments of module name, constant (e.g., "95"), variable name (the date associated with the constant), new constant (e.g., "1995"), source code file name, and source code line number.

The program correction portion of corrector 300 (Appendices D and E) provides correct code or new program ("NP"), test data points, and a complete attribute database 400 for all working storage, record field and screen field variables. The corrector 300 also generates reports 450.

A verification process has been performed through calculation of the weakest preconditions, as further specified in the above-referenced co-pending application, of the relevant segments of the new and old code. This is done for a postcondition that requires the variables of interest to contain any value of their type. This verification guarantees the equivalence of the new to the old code.

Corrector 300 also corrects data in the old format ("OD") used in the OP code to data in the new format ("ND") used in the corrected NP code. In one implementation, the corrector generates COBOL-language correction programs to be run on mainframe computers at data processing centers where the data is updated and stored. The corrector 300 generates two types of data correctors: (1) batch sequential data correctors ("BSDCs"), used for pipeline (output from one program is input for another) and one-time correction, and (2) wrapper data correctors ("WDCs") which are used for dynamic (random), run-time, access. These data correctors are generated from the variable and format information in the attribute database 400, using rules 310 similar to the data division code corrector. There is a distinct data corrector set for each file or file family (a file family is a collection of files determined by the identifier 200 to have exactly the same record formats). A data corrector set consists of up to two BSDCs (one from the old program to the new program, OD→ND, one ND→OD for error recovery, although the latter will result in error if applied to post-1999 year data) and a WDC. As each file family has its own distinct set of data corrector programs, it will be possible to customize "core" correctors to account for factors not detectable by the identifier 200 (for example, the "discriminated union" situation in which some record fields may be used as both a date and a non-date, with the interpretation determined by the value in another field).

BSDCs are suitable for any file that is processed sequentially, such as update and transaction files, input to and output from utility programs such as sort, merge, copy and update, and temporary files used for communication between programs. BSDC is also appropriate for one-time, shared file correction, such as correction of a master account file or an archive file, when all programs that access the file are corrected. Because of their operation in a pipeline, BSDCs are also called "filters". A pipeline is a JCL program in which the output file of one program is used as an input file to a subsequent program. A filter is a BSDC inserted in a pipeline to correct the format of files connecting individual programs, where one program is a new program NP and the other is an old program OP.

Figure 8:
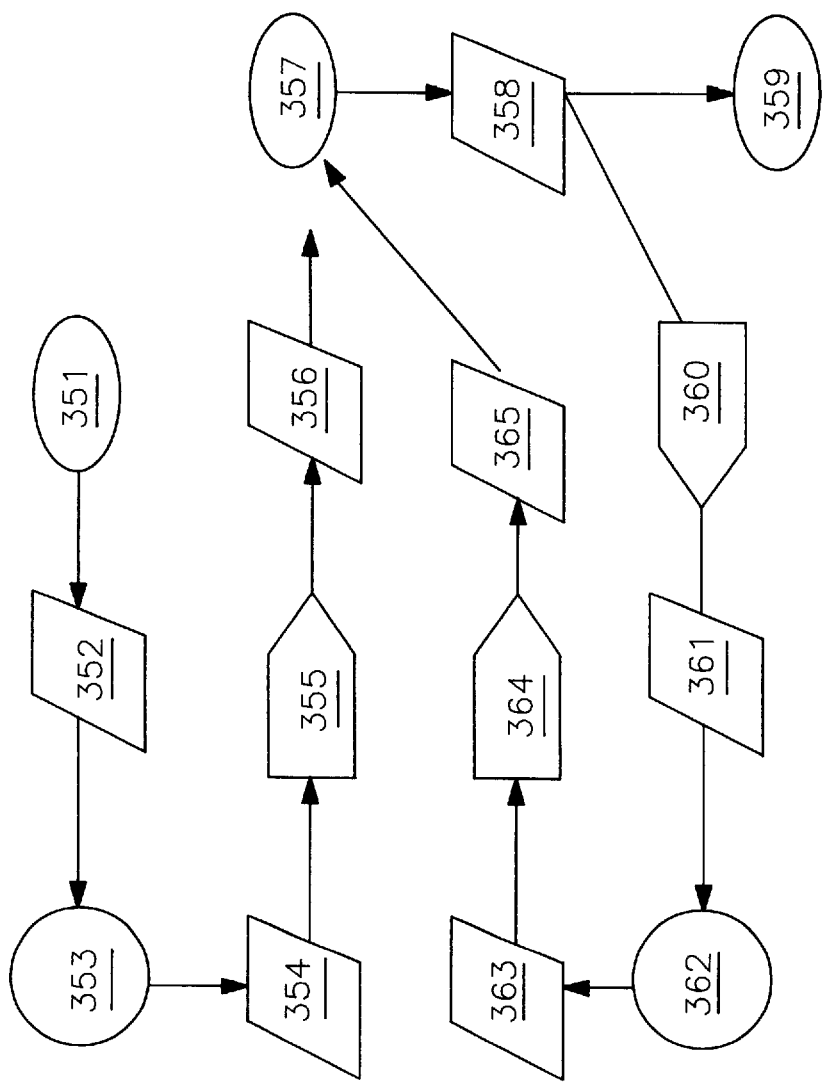
FIG. 8 is a flow diagram of a batch data correction pipeline.

FIG. 8 shows an example of a data correction pipeline using BSDCs in which ovals show programs, parallelograms show files, and pointed boxes show BSDC "filter" programs which read files sequentially in one format and rewrite them in the other format. On-line transactions are input using OP update program 351 under the old data format (uncorrected), resulting in OD transaction file 352 under the old format. Transaction file 351 is input into uncorrected OP sort program 353, resulting in update file 354 still under the old format. The update file is then modified by an OD→ND BSDC 355, resulting in ND temporary file 356 in the new format to be merged/updated by corrected NP merge-update program 357 with ND temporary file 365 also in new format, resulting in ND temporary file 358 in new format, which is also applied to corrected NP report program 359. The new format ND temporary file 358 is reverse corrected by ND→OD BSDC 360 to OD temporary file 361 in old format and copied by uncorrected OP copy program 362 to OD master file 363 in old format. The master is converted at OD→ND BSDC 364 to ND temporary file 365 in new format and merged with the ND update file in new format. Thus, both corrected and uncorrected programs can use the master file in different formats.

WDCs are used for files that are accessed concurrently by both corrected and uncorrected programs and in time-critical transactions. WDCs are created as "wrapper routines" ("WRs") generated during program correction, replacing input/output operations with calls to the wrapper routines, which, in turn, perform the actual input/output and correct dates during reads (convert from 2-digit, possibly with a century indicator, to a 4-digit representations) and reconvert during writes (back to 2-digit form). For example, the following NewProgram invokes WRs "WR-READ-YEAR" and "WR-WRITE-POLICY-RECORD":

```
OldProgram
    READ file-name INTO POLICY-DATE
        AT END . . .
        NOT AT END . . .
    END-READ
    WRITE POLICY-RECORD FROM POLICY-DATE
NewProgram
    CALL "WR-READ-POLICY-RECORD"
        IF AT-END > 0 . . .
        IF AT-END < 0 . . .
    END-READ
    CALL "WR-WRITE-POLICY-RECORD" USING POLICY-DATE
```

In this way, correction is performed dynamically or "on-the-fly", and the files can be shared with uncorrected programs. Similarly, when the COBOL program uses a database management system (DBMS) for input/output, rather than making direct READ and WRITE calls, the WRs will replace the DBMS calls and, in turn, will invoke the DBMS, allowing the use of the database in old format. This aspect of the invention allows modularity and incremental testability.

BSDCs may be coded using WRs. This can be accomplished by using a WR in a loop which reads an old data file and writes it to a new data file. The WDC read routine corrects each record as it is read. The WDC write routine receives four-digit year data and writes data in that form. Pseudo-code for a BSDC built from a WR follows:

CALL "WR-OPEN-READ-OLD" USING INPUT-FILE
    CALL "WR-OPEN-WRITE-NEW" USING OUTPUT-FILE
    WHILE (NOT-END-OF-FILE (INPUT-FILE)
    CALL "WR-READ-OLD" USING BUFFER
    CALL "WR-WRITE-NEW" USING BUFFER
    END-WHILE
    CALL "WR-CLOSE" USING INPUT-FILE
    CALL "WR-CLOSE" USING OUTPUT-FILE

After all accessing programs are corrected, wrappers can be removed. The strategies for this removal include relinking with dummy WRs that do not perform data correction, recorrecting the programs, directing corrector 300 not to replace input/output operations, and, dynamic removal, in which each WR contains a flag or switch allowing enablement or disablement of data correction.

The invention allows for computer system migration by converting millions of lines of program code and gigabytes of data incrementally in "globs" defined as a manageable unit of program code corresponding to a significant program or application (for example, code conveniently corrected during a weekend, possibly a million lines of COBOL code). The glob also includes all data files that are "local" to it in that it is accessed exclusively by code in the glob.

Figure 9A:
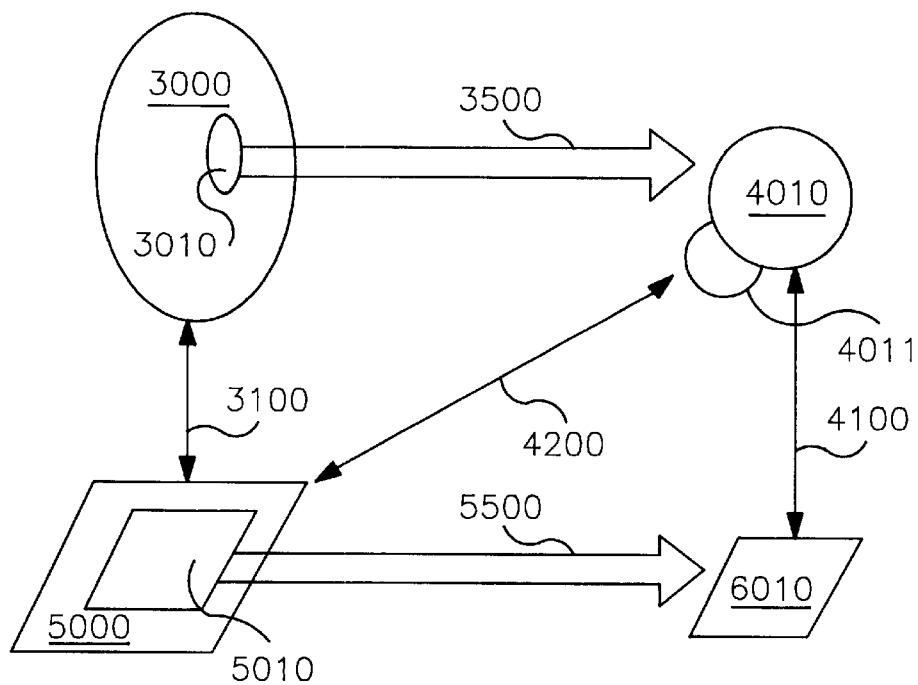
FIGS. 9A–E is are schematics of steps in incremental system migration or correction using the invention.

FIG. 9A shows the first step. Glob "A" has been identified and consists of both program code 3010 and associated local data 5010. The corrector 300 corrects code 3010 using code corrector 3500 and generates WR 4011 and the BSDC data correction program 5500. WR 4011 accesses all data that must be shared at run-time with uncorrected code. Input/output relations are shown by 3100 and 4100, as well as 4200. WR 4011 only accesses (4200) shared, random access files.

Figure 9B:
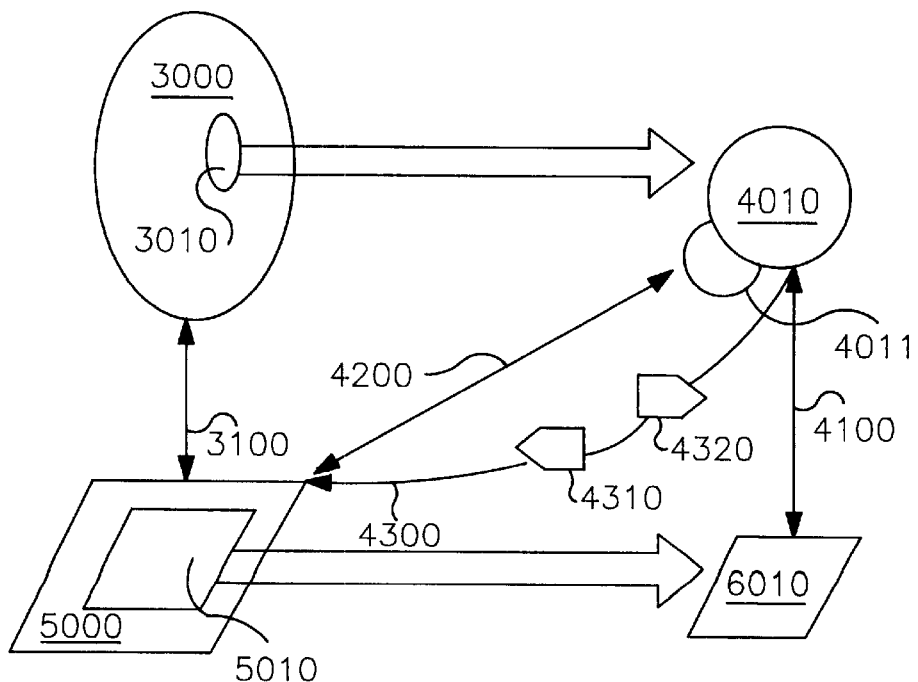

Optionally, corrector 300 next corrects JCL programs that invoke programs within Glob "A" code. This correction inserts BSD programs 4310 and 4320 for pipeline correction 4300. This resulting partly corrected system is shown in FIG. 9B. Because of the additional input/output time and use of storage space caused by inserting filters and attendant temporary files, as well as requirements for updating JCL as additional globs are corrected, this may not be a preferred option in many cases. WRs do not require additional input/output, only additional CPU time, which is small (and getting smaller) compared to input/output time.

Figure 9C:
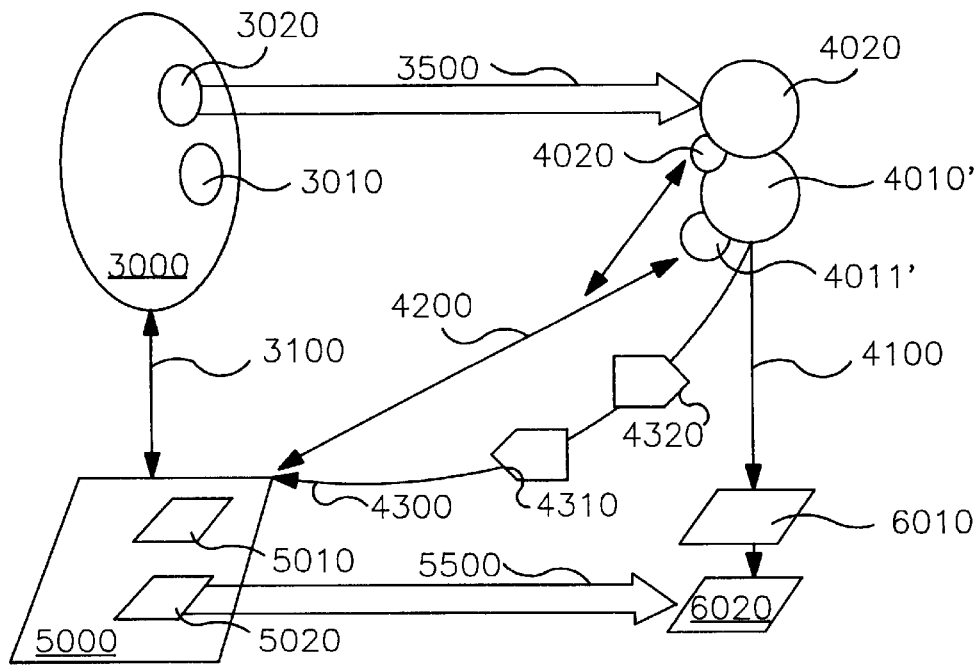

Next, Glob "B" is corrected, and corrector 300 attaches the "B" code 4020 to its own set of WRs 4021. In addition, OD 5020 and ND 6020 include not just the data that are local to "B", but that which is local to "A" and "B" together; accordingly, NC 4010' and WR 4011' are slightly modified from NC 4010 and WR 4011 associated with Glob "A". FIG. 9C shows the resulting partially corrected system.

Figure 9D:
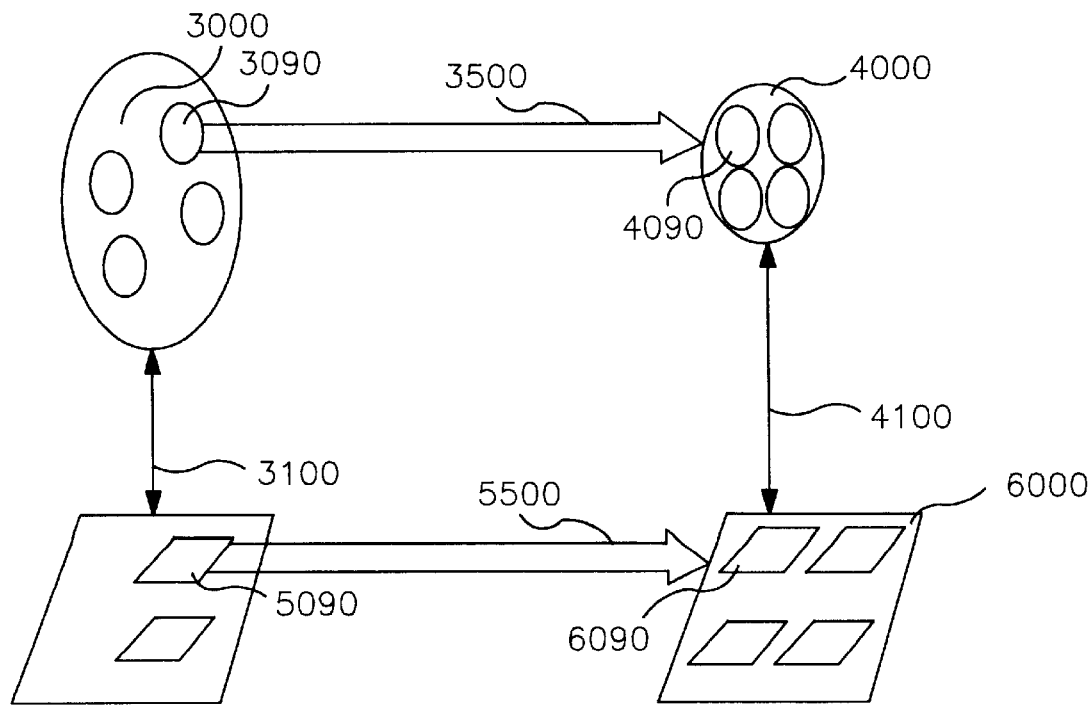

Glob-by-glob, the process continues until all code is corrected, as shown in FIG. 9D. At this point, WRs are no longer needed, so they are removed, in the implementation, by new, dynamically linked, dummy versions of the wrappers that pass data straight through without correction (the dummy wrappers are included within NP 4000). All code 4000 and data 6000 are corrected.

Figure 9E:
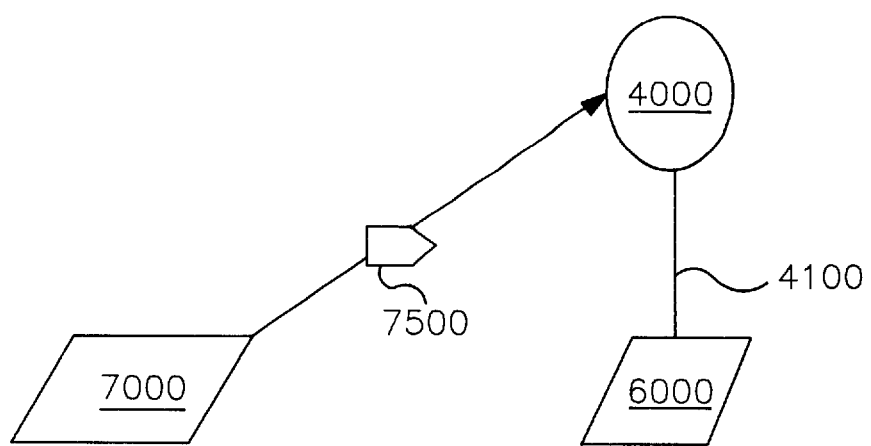

FIG. 9E shows the final, fully corrected system. Archived data 7000 is not corrected until it is required, and, even then, it is only batch corrected (7500) into temporary files for use by the new system NP 4000 and ND 6000. The archive files themselves are not changed.

Obviously the invention is extendible to other modifications involving the representation of variables, analogously to the changing of the field for the year, one example of which is modification to the currency field.

The invention has now been described in terms of several embodiments. Modifications and substitutions will now be apparent to persons of ordinary skill in the art. Accordingly, it is not intended that the invention be limited except as provided by the appended claims.

What is claimed is:

1. A process for modifying a computer program unit stored on media, said process comprising in sequence:

(a) identifying all variables in said computer program unit;

(b) selecting as seeds a subset of variables that share a set of known attributes and storing the identity of said seeds;

(c) determining from the syntax of elements of the computer program unit which of the remaining variables is related to one or more of the seeds such that they share the same set of attributes;

(d) storing the identities of said related remaining variables in a transitive closure database;

(e) repeating steps (c) and (d) with said related variables as seeds until there are no new related variables; and (f) modifying said computer program unit in accordance with the contents of the transitive closure database.

2. The process of claim 1 in which said computer program unit is first translated into an intermediate language.

3. The process of claim 2 in which said intermediate language is based upon Dikjstra's guarded commands.

4. The process of claim 1 further comprising the repetition of steps (c) through (e) for unlinked computer program units and using the resultant transitive closure database as seeds for said repetition.

5. A process for computer system data migration employing the process of claim 1 to create wrapper routines for use by modified computer program units to access unmodified data.

6. The process of claim 5 further comprising the steps of:

(a) modifying a computer program unit and data exclusively associated therewith of manageable size;

(b) creating a wrapper routine for such modified unit to access unmodified data;

(c) repeating steps (a) and (b), also modifying data exclusively associated with modified computer program units until all computer program units are modified.

7. A process for computer system data migration comprising the steps of:

(a) modifying a computer program unit and data exclusively associated therewith of manageable size;

(b) creating a wrapper routine for such modified unit to access unmodified data;

(c) repeating steps (a) and (b), also modifying data exclusively associated with modified computer program units until all computer program units are modified.

8. A tool for modifying a computer program unit stored on media, said tool comprising:

(a) a program text analyzer;

(b) an attribute propagator for identifying variables affected by variables with a known attribute according to program text syntax;

(c) a database of identified variables and their attributes; and (d) a corrector for modifying program text according to the contents of said database.

9. The tool of claim 8 further comprising a front end translator for translating the source code into an intermediate language.

10. The tool of claim 9 wherein the intermediate language is based upon Dikjstra's guarded commands.

* * * * *